(12) United States Patent
Liu

(10) Patent No.: US 7,037,986 B2
(45) Date of Patent: May 2, 2006

(54) LEAD FREE SOLDER FRIENDLY THERMOPLASTIC BLENDS AND METHODS OF MANUFACTURE THEREOF

(75) Inventor: Bo Liu, Coatesville, PA (US)

(73) Assignee: General Electric Company, Pittsfield, MA (US)

( * ) Notice: Subject to any disclaimer, the term of this patent is extended or adjusted under 35 U.S.C. 154(b) by 40 days.

(21) Appl. No.: 10/994,569

(22) Filed: Nov. 22, 2004

(65) Prior Publication Data

US 2005/0137354 A1 Jun. 23, 2005

Related U.S. Application Data

(60) Provisional application No. 60/531,233, filed on Dec. 19, 2003.

(51) Int. Cl.
*C08F 283/08* (2006.01)
(52) U.S. Cl. ............... 525/534; 525/537; 525/535; 525/905; 524/442; 524/423
(58) Field of Classification Search ........... 525/534, 525/537, 535, 905; 524/442, 423
See application file for complete search history.

(56) References Cited

U.S. PATENT DOCUMENTS

| | | | |
|---|---|---|---|
| 3,078,254 | A | 2/1963 | Zelinski et al. |
| 3,265,765 | A | 8/1966 | Holden et al. |
| 3,297,793 | A | 1/1967 | Dollinger et al. |
| 3,354,129 | A | 11/1967 | Edmonds, Jr. et al. |
| 3,402,159 | A | 9/1968 | Hsieh |
| 3,594,452 | A | 7/1971 | De La Mare et al. |
| 5,214,083 | A | 5/1993 | Kodaira et al. |
| 5,502,122 | A | 3/1996 | Weber et al. |
| 5,561,199 | A | 10/1996 | Nagaoka et al. |
| 6,211,327 | B1 | 4/2001 | F. M. Braat et al. |
| 6,300,461 | B1 | 10/2001 | Braat et al. |
| 6,303,748 | B1 | 10/2001 | Braat et al. |
| 6,429,277 | B1 | 8/2002 | Braat et al. |
| 6,437,085 | B1 | 8/2002 | Braat et al. |
| 6,552,105 | B1 | 4/2003 | Braat et al. |
| 6,576,700 | B1 | 6/2003 | Patel |
| 2003/0060552 | A1* | 3/2003 | Balfour et al. ............ 524/423 |

FOREIGN PATENT DOCUMENTS

| | | |
|---|---|---|
| GB | 962941 | 1/1962 |
| GB | 1264741 | 3/1970 |
| JP | 62065351 | 3/1987 |
| WO | WO 00/64973 | 11/2000 |

OTHER PUBLICATIONS

"LMW PPO Boosts Temperature Resistance of Hot Melts" http://www.adhesivesmag.com/CDA/ArticleInformation/features/BNP_Features_Item/O, . . . , Nov. 4, 2004, 4 pages.
"Polymers as Additives" http://www.plasticstechnology.com/article/200107fal.html, Nov. 4, 2004, 4 pages.
ASTM Designation: D 638-03 "Standard Test Method for Tensile Properties of Plastics" 15 pages.
ASTM Designation: D 648-01 "Deflection Temperature of Plastics Under Flexural Load in the Edgewise Position" 12 pages.
UL 94 "Test for Flammability of Plastic Materials for Parts in Devices and Appliances" Underwriters Laboratories, Inc., Northbrook, IL, Fifth Edition, Oct. 29, 1996.

* cited by examiner

*Primary Examiner*—Ling-Sui Choi

(57) ABSTRACT

Disclosed herein is a high temperature composition comprising a polyarylene ether consisting essentially of plurality of structural units of the formula (I):

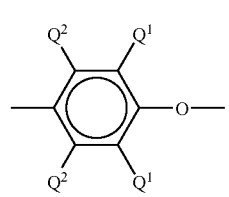

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram; a polyarylene sulfide; and glass fibers.

26 Claims, No Drawings

LEAD FREE SOLDER FRIENDLY THERMOPLASTIC BLENDS AND METHODS OF MANUFACTURE THEREOF

CROSS REFERENCE TO RELATED APPLICATIONS

This application claims the benefit of U.S. Provisional Application Ser. No. 60/531,233 filed 19 Dec. 2003.

BACKGROUND

This disclosure relates to solder resistant high temperature compositions and methods for manufacturing the same.

Because of the desire to miniaturize products and to improve productivity in the electronics industry, a method of soldering resinous electronic parts has been developed for affixing parts such as connectors, switches, relays and coil bobbins to printed circuit board. This method has been named a "surface-mount" technology.

The term "surface-mount" as used herein refers to a mounting system wherein electronic parts are affixed to a printed circuit board. A creamy lead-free solder is used to facilitate the adhesion of the electronic parts to the printed circuit board. Thermoplastic compositions are also often used as insulating materials for electronic parts. The printed circuit board is then passed through a heating oven (reflowing oven), thereby melting the solder to fix the electronic parts to the wiring board. The surface-mount technology permits mounting to be conducted on both surfaces of the printed circuit board thereby reducing production costs.

However, the surface-mount technology suffers from several drawbacks. For example, upon exposure to a lead-free solder, many of the thermoplastic compositions that are used as insulators begin to fail. Loss of insulating ability, which generally occurs after failure, renders the thermoplastic composition unreliable for these types of applications. It is therefore desirable to have thermoplastic compositions that can contact lead free solder without any of the aforementioned disadvantages.

SUMMARY

Disclosed herein is a high temperature composition comprising a polyarylene ether consisting essentially of plurality of structural units of the formula (I):

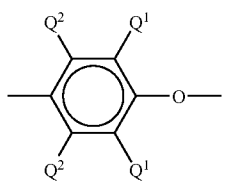

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram; a polyarylene sulfide; and glass fibers.

Disclosed herein is a high temperature composition comprising a polyphenylene ether consisting essentially of plurality of structural units of the formula (I):

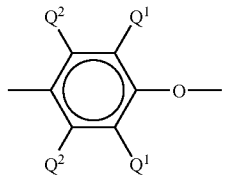

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram; and a polyarylene sulfide, wherein the composition has a heat distortion temperature value of greater than or equal to about 250° C., a notched Izod impact strength of greater than or equal to about 1 ft-lb/inch and a UL-94 flammability rating of V-0.

Disclosed herein too is a method of manufacturing an article comprising blending a composition comprising a polyarylene ether consisting essentially of plurality of structural units of the formula (I):

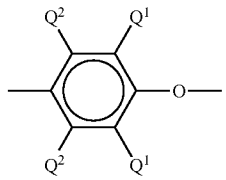

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram; a polyarylene sulfide; and glass fibers.

DETAILED DESCRIPTION OF EMBODIMENTS

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein is a solder resistant high temperature composition that comprises a polyarylene ether, a polyarylene sulfide, and glass fibers. The polyarylene ether has an intrinsic viscosity (IV) less than or equal to about 0.15 deciliter per gram as determined in chloroform at 25° C. The use of the low IV polyarylene ether permits improved blending which leads to improved high temperature properties. The high temperature composition also advantageously displays a thermal resistance effective to withstand the high temperatures encountered in a re-flowing oven. Further, the high temperature compositions more closely match the thermal shrinkage of polybutylene terephthalate (PBT), which is presently used in solder connector applications. The high temperature compositions are also advantageous in that the thermal performance is improved without any changes to existing processing equipment such as molding machines, dies, molds, extruders, and the like. The high temperature compositions can also be molded into various shapes and forms such as connectors, circuit boards, pipes, rods, films, sheets and bearings, which renders them useful in electrical applications which might result in contact with lead free solder.

As noted above, the high temperature composition comprises a polyarylene ether, a polyarylene sulfide, and glass fibers. The polyarylene ether and the polyarylene sulfide constitute a thermoplastic blend. The term polyarylene ether includes polyphenylene ether (PPE), polyarylene ether ionomers, polyarylene ether copolymers, polyarylene ether graft copolymers, block copolymers of polyarylene ethers with alkenyl aromatic compounds or vinyl aromatic compounds, and the like; and combinations comprising at least one of the foregoing polyarylene ethers. Partially crosslinked polyarylene ethers, as well as mixtures of branched and linear polyarylene ethers may also be used in the high temperature compositions. The polyarylene ethers comprise a plurality of structural units of the formula (I):

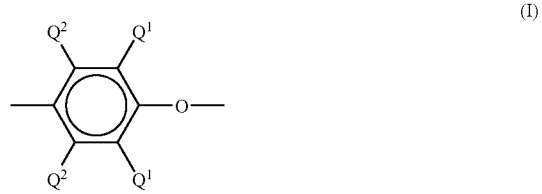

(I)

wherein for each structural unit, each $Q^1$ and $Q^2$ are independently a halogen, a primary or secondary lower alkyl (e.g., an alkyl containing up to 7 carbon atoms), a phenyl, a haloalkyl, an aminoalkyl, a hydrocarbonoxy, a halohydrocarbonoxy wherein at least two carbon atoms separate the halogen and oxygen atoms, or the like. It is desirable for each $Q^1$ to be an alkyl or a phenyl. In one embodiment, it is desirable for the alkyl group to have from 1 to 4 carbon atoms and for each $Q^2$ to be hydrogen.

The polyarylene ethers may be either homopolymers or copolymers. The homopolymers are those containing 2,6-dimethylphenylene ether units. Suitable copolymers include random copolymers containing, for example, such units in combination with 2,3,6-trimethyl-1,4-phenylene ether units or alternatively, copolymers derived from copolymerization of 2,6-dimethylphenol with 2,3,6-trimethylphenol. Also included are polyarylene ethers containing moieties prepared by grafting vinyl monomers or polymers such as polystyrenes, as well as coupled polyarylene ethers in which coupling agents such as low molecular weight polycarbonates, quinones, heterocycles, and formals undergo reaction with the hydroxy groups of two polyarylene ether chains to produce a higher molecular weight polymer. Suitable polyarylene ethers further include combinations comprising at least one of the above homopolymers or copolymers.

In one embodiment, the polyarylene ethers have an intrinsic viscosity of about 0.08 to about 0.15 deciliters per gram (dl/g), when measured in chloroform at 25° C. In another embodiment, the polyarylene ethers have an intrinsic viscosity of about 0.1 to about 0.13 dl/g, as measured in chloroform at 25° C. An exemplary intrinsic viscosity is about 0.12 dl/g, as measured in chloroform at 25° C. It is also possible to utilize a blend of high intrinsic viscosity polyarylene ether and low intrinsic viscosity polyarylene ether so long as the intrinsic viscosity of the blend lies between about 0.08 to about 0.0.15 dl/g. Determining an exact ratio when two intrinsic viscosities are used will depend somewhat on the exact intrinsic viscosities of the polyarylene ether used and the ultimate physical properties that are desired.

The polyarylene ethers are generally prepared by the oxidative coupling of at least one monohydroxyaromatic compound such as 2,6-dimethylphenol or 2,3,6-trimethylphenol. Catalyst systems employed for such coupling; generally contain at least one heavy metal compound such as a copper, manganese, or cobalt compound, usually in combination with various other materials.

Particularly useful polyarylene ethers are those that comprise molecules having at least one aminoalkyl-containing end group. The aminoalkyl-containing end group may be located in an ortho position to the hydroxy group. Products containing such end groups may be obtained by incorporating an appropriate primary or secondary monoamine such as di-n-butylamine or dimethylamine as one of the constituents in the oxidative coupling reaction mixture. Also desirable are 4-hydroxybiphenyl end groups, generally obtained from reaction mixtures in which a by-product diphenoquinone is present, especially in a copper-halide-secondary or tertiary amine system. A substantial proportion of the polymer molecules constituting as much as about 90 wt % (weight percent) of the polymer, may contain at least one of the aminoalkyl-containing and 4-hydroxybiphenyl end groups.

The polyarylene ether is generally present in an amount of about 1 wt % to about 90 wt %, based upon the weight of the high temperature composition. In another embodiment, the polyarylene ether is generally present in an amount of greater than or equal to about 5 wt %, based upon the weight of the high temperature composition. In yet another embodiment, the polyarylene ether is generally present in an amount of greater than or equal to about 10 wt %, based upon the weight of the high temperature composition. In yet another embodiment, the polyarylene ether is generally present in an amount of greater than or equal to about 15 wt %, based upon the weight of the high temperature composition. It is generally desirable to have the polyarylene ether present in an amount less than or equal to about 50 wt %, based upon the weight of the high temperature composition. In another embodiment, the polyarylene ether present in an amount less than or equal to about 40 wt %, based upon the weight of the high temperature composition. In yet another embodiment, the polyarylene ether present in an amount less than or equal to about 20 wt %, based upon the weight of the high temperature composition.

The term polyarylene sulfide includes polyphenylene sulfide (PPS), polyarylene sulfide ionomers, polyarylene sulfide copolymers, polyarylene sulfide graft copolymers, block copolymers of polyarylene sulfides with alkenyl aromatic compounds or with vinyl aromatic compounds, and combinations comprising at least one of the foregoing polyarylene sulfides. Partially crosslinked polyarylene sulfides, as well as mixtures of branched and linear polyarylene sulfides, may be used in the high temperature compositions.

Polyarylene sulfides are known polymers comprising a plurality of structural units of the formula (II):

wherein R is an aromatic radical such as phenylene, biphenylene, naphthylene, oxydiphenyl, diphenyl sulfone, or is a lower alkyl radical, or a lower alkoxy radical, or halogen substituted derivatives thereof. The lower alkyl and alkoxy substituents typically have about one to about six carbon atoms, for example methyl, ethyl, propyl, isobutyl, n-hexyl, and the like. In one embodiment, the polyarylene sulfide is a polyphenylene sulfide having repeating structural units of formula (III).

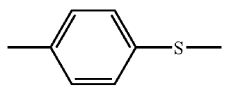

The polyarylene sulfide has a melt index of about 10 grams to about 10,000 grams per 10 minutes when measured by ASTM D-1238-74 (315.6° C.; load, 5 kg). In one embodiment, the polyarylene sulfide will have an inherent viscosity of about 0.05 to about 0.4, as determined at 206° C. in 1-chloronaphthalene at a polymer concentration of 0.4-g/100 mL solution. In another embodiment, the polyarylene sulfide will have an inherent viscosity of about 0.1 to about 0.35, when measured under the aforementioned conditions.

Suitable polyarylene sulfides may be prepared by reacting in a polar organic compound at an elevated temperature at least one polyhalo-substituted cyclic compound containing unsaturation between adjacent ring atoms such as 1,2-dichlorobenzene, 1,3-dichlorobenzene, 2,5-dibromobenzene and 2,5-dichlorotoluene with an alkali metal sulfide. The alkali metal sulfides are generally monosulfides of sodium, potassium, lithium, rubidium, and cesium. Generally the polar organic compound will substantially dissolve both the alkali metal sulfide and the polyhalo-substituted aromatic compound or other reaction by-products. The polymers can also be manufactured by a method wherein metal salts of halothiophenols are heated to a polymerization temperature.

In one embodiment, the high temperature composition can comprise an amount of about 10 wt % to about 99 wt % polyarylene sulfide, based upon the weight of the high temperature composition. In another embodiment, the high temperature composition can comprise an amount of greater than or equal to about 20 wt % of polyarylene sulfide, based upon the weight of the high temperature composition. In yet another embodiment, the high temperature composition can comprise an amount of greater than or equal to about 25 wt % of polyarylene sulfide, based upon the weight of the high temperature composition. It is desirable for the polyarylene sulfide to be present in an amount of less than or equal to about 80 wt %, based upon the weight of the high temperature composition. In yet another embodiment, the polyarylene sulfide is present in an amount of less than or equal to about 70 wt %, based upon the weight of the high temperature composition.

The high temperature composition generally comprises the thermoplastic blend in an amount of about 25 wt % to about 90 wt %, based upon the weight of the high temperature composition. As noted above, the thermoplastic blend comprises the polyarylene ether and the polyarylene sulfide. In one embodiment, the high temperature composition generally comprises the thermoplastic blend in an amount of greater than or equal about 45 wt %, based upon the weight of the high temperature composition. In another embodiment, the high temperature composition generally comprises the thermoplastic blend in an amount of greater than or equal about 55 wt %, based upon the weight of the high temperature composition. In yet another embodiment, the high temperature composition generally comprises the thermoplastic blend in an amount of greater than or equal about 65 wt %, based upon the weight of the high temperature composition. In one embodiment, the high temperature composition generally comprises the thermoplastic blend in an amount of less than or equal about 85 wt %, based upon the weight of the high temperature composition. In yet another embodiment, the high temperature composition generally comprises the thermoplastic blend in an amount of less than or equal about 80 wt %, based upon the weight of the high temperature composition.

Glass fibers are used in the high temperature compositions. Glass fibers comprising about 50 to about 90 wt % $SiO_2$ (silica) are used in the high temperature composition. However greater or lesser amounts of $SiO_2$ may be used in the glass fiber compositions for unique applications. The glass fibers may also include $Li_2O$, $Na_2O$, $K_2O$, BeO, MgO, CaO, BaO, $TiO_2$, MnO, $Fe_2O_3$, NiO, CuO, AgO, ZnO, $B_2O_3$, $Al_2O_3$, $F_2$, $WO_3$, $CeO_2$, $SnO_2$, or the like, or a combination comprising at least one of the foregoing substances. The selection of a particular glass composition is made in accordance with the desired processing characteristics and the final properties of the high temperature composition desired for a particular use.

Useful glass fibers can generally be formed from a fiberizable glass including those fiberizable glasses referred to as "E-glass," "A-glass," "C-glass," "D-glass," "R-glass," and "S-glass". Glass fibers obtained from E-glass derivatives may also be used. Most reinforcement mats comprise glass fibers formed from E-glass and are included in the high temperature compositions. Commercially produced glass fibers generally having nominal filament diameters of greater than or equal to about 8 micrometers can be used in the high temperature compositions. It is desirable to use glass fibers having filament diameters of less than or equal to about 35 micrometers. In one embodiment, it is desirable to use glass fibers having filament diameters having diameters of less than or equal to about 15 micrometers. The filaments may be produced by steam or air blowing, flame blowing, and mechanical pulling processes. Exemplary filaments are made by mechanical pulling. Fibers having an asymmetrical cross section may also be used in the high temperature composition. The glass fibers may also be sized or unsized. Sized glass fibers are coated on at least a portion of their surfaces with a sizing composition selected for compatibility with the thermoplastic polymers. The sizing composition facilitates wet-out and wet-through of the matrix material upon the fiber strands and assists in attaining desired physical properties in the high temperature composition.

In one embodiment, the glass fibers comprise glass strands that have been sized. In preparing the sized glass fibers, a number of filaments can be formed simultaneously, sized with a coating agent and then bundled into what is called a strand. Alternatively the strand itself may be first formed of filaments and then sized. The amount of sizing employed is generally an amount effective to bind the glass filaments into a continuous strand and is generally greater than or equal to about 0.1 wt % based on the total weight of the glass fibers in the strand. In one embodiment, the amount of sizing is less than or equal to about 5 wt %, based upon the weight of the glass fibers. In another embodiment, the amount of sizing is less than or equal to about 2 wt %, based upon the weight of glass fibers. In yet another embodiment the amount of sizing is about 1 wt %, based on the weight of the glass fibers.

In general, the glass fibers are present in the high temperature composition in an amount of about 10 wt % to about 70 wt %, based upon the weight of the high temperature composition. In one embodiment, the glass fibers are present in an amount of greater than or equal to about 12 wt %, based upon the weight of the high temperature composition. In another embodiment, the glass fibers are present in an amount of greater than or equal to about 15 wt %, based upon the weight of the high temperature composition. It is desirable to have the glass fibers present in an amount of less than or equal to about 50 wt %, based upon the weight of the high temperature composition. In another embodiment, the glass fibers present in an amount of less than or equal to about 40 wt %, based upon the weight of the high temperature composition.

Additional polymeric resins can optionally be added to the high temperature composition. Examples of polymeric resins that can optionally be added to the high temperature composition are thermoplastic resins, impact modifiers, thermosetting resins, or the like, or a combination comprising at least one of the foregoing polymeric resins.

Additional thermoplastic resins that may also be added to the high temperature composition include polyacetal, polyacrylic, styrene acrylonitrile, acrylonitrile-butadiene-styrene (ABS), polycarbonate, polystyrene, polyethylene, polypropylene, polyethylene terephthalate, polybutylene terephthalate, nylons (nylon-6, nylon-6/6, nylon-6/10, nylon-6/12, nylon-11 or nylon-12), polyamideimide, polyarylate, polyurethane, ethylene propylene diene rubber (EPR), ethylene propylene diene monomer (EPDM), polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, and combinations comprising at least one of the foregoing thermoplastics.

The additional thermoplastic resins can be added to the high temperature composition in an amount of greater than or equal to about 0.1 wt %, based upon the weight of the high temperature composition. In one embodiment, the additional thermoplastic resins can be added to the high temperature composition in an amount of less than or equal to about 20 wt %, based upon the weight of the high temperature composition. In another embodiment, the additional thermoplastic resins can be added to the high temperature composition in an amount of less than or equal to about 15 wt %, based upon the weight of the high temperature composition. In yet another embodiment, the additional thermoplastic resins can be added to the high temperature composition in an amount of less than or equal to about 10 wt %, based upon the weight of the high temperature composition.

Impact modifiers may also be added to the high temperature composition. These impact modifiers include block copolymers such as, for example, A-B-A triblock copolymers and A-B diblock copolymers. The A-B-A and A-B type block copolymer may be thermoplastic rubbers comprised of one or two alkenyl aromatic blocks, which are generally styrene blocks and an elastomeric block, e.g., a butadiene block that is partially hydrogenated. Mixtures of these diblock and triblock copolymers are especially useful. Examples of suitable impact modifiers of the A-B and A-B-A type block copolymers include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBR), polystyrene-poly(ethylene-propylene)-polystyrene, polystyrene-polyisoprene-polystyrene and poly($\alpha$-methylstyrene)-polybutadiene-poly($\alpha$-methylstyrene), as well as the selectively hydrogenated versions thereof, or the like, or a combination comprising at least one of the foregoing impact modifiers. Mixtures of the aforementioned block copolymers are also useful. Such A-B and A-B-A block copolymers are available commercially from a number of sources, including Phillips Petroleum under the trademark SOLPRENE®, Shell Chemical Co., under the trademark KRATON®, Dexco under the tradename VECTOR®, and Kuraray under the trademark SEPTON®. Impact modifiers, if present, are used in amounts of about 1 to about 20 wt % based on the solder free composition.

Thermosetting resins may also be added to the solder free composition. These thermosetting resins can be added for purposes of impact modification if desired. Examples of suitable thermosetting resins include polyurethane, natural rubber, synthetic rubber, epoxy, phenolic, polyesters, polyamides, silicones, or the like, or a combination comprising at least one of the foregoing thermosetting resins. Where it is desirable to add additional thermoplastic or thermosetting resins or combinations of thermoplastic and thermosetting resins to the high temperature composition, they may be added in an amount of about 1 to about 20 wt % based upon the weight of the high temperature composition.

Other additives may also be optionally added to the high temperature composition including, for example, mineral fillers, antioxidants, lubricants, surfactants, antistatic agents, flow control agents, flow promotors, impact modifiers, nucleating agents, coupling agents, flame retardants, and the like. Similarly, addition of pigments and dyes (inorganic and organic) may also be used.

An exemplary additive is a flow promotor comprising pentaerythritoltetrastearate. A commerically available flow promotor is GLYCOLUBE® commerically available from Lonza Incorporated. Flow promotors may be added in amounts of about 0.1 to about 1 wt %, based on the total weight of the high temperature composition.

The high temperature composition can be manufactured by melt blending, solution blending, or by combinations comprising at least one of the foregoing methods of blending. Melt blending of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Melt blending involving the aforementioned forces may be conducted in machines such as, single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines. It is generally desirable during melt or solution blending of the composition to impart a specific energy of about 0.01 to about 10 kilowatt-hour/kilogram (kwhr/kg) of the composition.

The high temperature compositions can be manufactured by a number of methods. In one exemplary process, the thermoplastic polymers, the glass fibers, and additional ingredients are compounded in an extruder and extruded to produce pellets. During the extrusion, the glass fibers and other ingredient are dispersed in the thermoplastic polymeric matrix. In another exemplary process, the glass fibers along with the other ingredients are compounded with the thermoplastic polymers in a dry blending process e.g., in a Henschel mixer, and then either fluxed on a mill and comminuted or extruded and chopped. The high temperature composition can also be mixed in a dry blending process and directly molded, e.g., by injection molding or any other suitable transfer molding technique. It is desirable to have all of the components of the high temperature composition free from water prior to extrusion and/or molding.

In another exemplary method of manufacturing the high temperature composition, the glass fibers can be masterbatched into a resin composition comprising the polyarylene ether and/or the polyarylene sulfide. The masterbatch may then be let down with additional polyarylene ether and/or the polyarylene sulfide during the extrusion process or the molding process to form the high temperature composition.

When compounding occurs in an extruder, it is generally carried out so as to ensure that the residence time in the machine is short. The temperature in the extruder is carefully controlled and friction heat can be utilized in part or in whole to ensure that an intimate blend of the glass fiber with the thermoplastic matrix is obtained. In cases where frictional heating is utilized in part, the remaining heat may be supplied through electrical heating bands mounted on the barrels of the extruder. Oil heating of the extruder barrels may also be used.

Exemplary extrusion temperatures are about 180 to about 400° C. The compounded high temperature composition can be extruded into granules or pellets, cut into sheets or shaped into briquettes for further downstream processing. The composition can then be molded in equipment generally employed for processing thermoplastic compositions, e.g., a Newbury type injection molding machine with cylinder temperatures of about 220 to about 400° C., and mold temperatures of about 75 to about 140° C.

Use of polyarylene ethers that have a low intrinsic viscosity permits ease of processing. The ease of processing results in a better dispersion of the glass fibers resulting in reduced flaws and/or defects in manufactured articles. This promotes improved physical properties such as impact properties as determined in Notched Izod tests conducted at room temperature (25° C.). In one embodiment, the high temperature composition has an impact strength of greater than or equal to about 1 ft-lb/inch in a notched Izod test conducted at 25° C. In another embodiment, the high temperature composition has a notched Izod impact strength of greater than or equal to about 1.5 ft-lb/inch. In yet another embodiment, the high temperature composition has a notched Izod impact strength of greater than or equal to about 2 ft-lb/inch. The high temperature compositions also display a heat distortion temperature of greater than or equal to about 250° C. In one embodiment, the high temperature compositions display a heat distortion temperature of greater than or equal to about 260° C. In another embodiment, the high temperature compositions display a heat distortion temperature of greater than or equal to about 270° C. In yet another embodiment, the high temperature compositions display a heat distortion temperature of greater than or equal to about 280° C.

Articles manufactured from the high temperature composition can also be flame retardant. This flame retardancy can be achieved without adding any flame retardant additives. In one embodiment, articles having a thickness of 1.6 millimeter when tested according to the procedure of Underwriter's Laboratory Bulletin 94 entitled "Tests for Flammability of Plastic Materials, UL94", has a flame retardancy rating of UL-94 V-2. In another embodiment, articles having a thickness of 1.6 millimeter have a flame retardancy rating of UL-94 V-1. In another embodiment, articles having a thickness of 1.6 millimeter have a flame retardancy rating of UL-94 V-0.

Molded samples can have a smooth surface. In one embodiment, articles manufactured from the high temperature composition can have a Class A surface finish.

The high temperature compositions can be advantageously used for a wide variety of applications where high temperature stability is desired. Examples of such applications are electronic applications where the high temperature compositions can be advantageously used for their resistance to lead free solder. Other applications include automotive applications such as dash boards, exterior body panels of appliances, or the like.

The following examples, which are meant to be exemplary, not limiting, illustrate compositions and methods for manufacturing the high temperature compositions described herein.

EXAMPLES

These examples demonstrate the advantageous properties of a high temperature composition comprising polyarylene ether having an intrinsic viscosity below 0.15 dl/g. Sample 1 contains a low intrinsic viscosity polyphenylene ether (PPE) having an intrinsic viscosity of 0.12 dl/g while Sample 2 is a comparative example containing a PPE having an intrinsic viscosity of 0.4 dl/g; Both samples of PPE were manufactured by GE Plastics. The polyphenylene sulfide (PPS) was FORTRON 214® commercially available from Ticona Corporation. The flow promotor (lubricant) was pentaerythritol stearate (PETS) available under the tradename GLYCOLUBE® from Lonza Inc. The glass fibers used were Type E glass fibers obtained from Johns Manville. The glass fibers had a diameter of 13 micrometers and a length of about 3 millimeter. Table 1 below shows details of the composition of Sample 1 and Sample 2 respectively.

The components for each lead-free solder friendly sample were extruded in a 40 mm twin-screw extruder (ZSK-40) manufactured by Krupp, Werner and Pfleiderer. The extruder had 5 barrels or heating zones set at temperatures of 293° C., 293° C., 293° C., 298° C., and 298° C. The die temperature was set at 298° C. The extruder was run at 250 rpm. The extrusion rate was 175 pounds per hour. The strand emanating from the extruder was pelletized, dried and subjected to injection molding to manufacture the test parts. The molding machine was a Cincinnati 220T. The amounts of each component employed in the various compositions are shown in Table 1. All ingredients were added directly in the extruder during extrusion.

The injection molded samples were tested for their mechanical properties and thermal properties. The samples were subjected to tensile tests as per ASTM D 638, Notched Izod impact property tests as per ASTM D 256, and heat distortion temperature (HDT) tests as per ASTM D 648. Five samples were tested for each test.

The samples were also subjected to a flammability test as per UL-94. The probability of a first time pass (achieving V-0) in a flammability test is expressed in terms of p(FTP). For samples that can achieve V-0 in a first pass, the p(FTP) value is 1 or as close to 1 as possible, while samples that are not capable of achieving V-0 in a first pass have a p(FTP) value that is significantly less than 1. In other words, the closer the p(FTP) value is to 1, the better the flame retardancy properties of the composition. The results for all the tests are shown in the Table 1.

TABLE 1

| Component | Sample 1 (wt %) | Sample 2 (wt %) |
|---|---|---|
| Polyphenylene Sulfide (PPS) resin | 64.5 | 64.5 |
| 0.12 IV polyphenylene ether (PPE) resin | 10 | |
| 0.4 IV polyphenylene ether (PPE) resin | | 10 |
| Type E Glass Fiber 748 | 25 | 25 |
| Pentaerythritol tetrastearate lubricant (PETS) | 0.5 | 0.5 |
| Properties | | |
| Tensile Strength (kg/cm$^2$) | 1139 | 1090 |
| Tensile Elongation (%) | 1.4 | 1.44 |
| Tensile Modulus (kg/cm$^2$) | 94,211 | 89,992 |
| Flexural Modulus (kg/cm$^2$) | 90,696 | 88,586 |
| Flexural Strength (kg/cm$^2$) | 1996 | 1771 |
| Notched Izod impact strength (ft-lb/inch) | 1.26 | 0.2 |
| Unnotched Izod impact strength (ft-lb/inch) | 5.6 | 4.1 |
| UL-94 Flammability Rating (1.5 mm) | V-0 | V-0 |
| p(FTP)* | 0.99 | 0.85 |
| HDT (° C.) | 272 | 257 |

*determined from 5 samples

As illustrated above in Table 1, it can be seen that the sample manufactured from the low intrinsic viscosity PPO has superior mechanical, thermal and flammability properties. For example, the tensile strength and the impact properties of the Sample 1 is superior to the properties of the Sample 2. Similarly when flammability properties are compared, the Sample 1 shows a probability of a first time pass that is superior to that of Sample 2. As shown in the Table 2, the high temperature composition has a p(FTP) of greater than 0.9. As noted above, the high temperature composition can have a p(FTP) of 1.

As illustrated above, the samples manufactured with an intrinsic viscosity of less than or equal to about 0.15 dl/g, produce high temperature compositions having superior mechanical, thermal and flammability properties. The high temperature compositions having the low intrinsic viscosity PPO can be advantageously used as a solder resistant support in electronic applications. The high temperature compositions can also be utilized for numerous applications in the automotive sector, the appliances sector, heavy equipment such as lathes, earth moving equipment, or the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A high temperature composition consisting essentially of:
   a polyarylene ether consisting essentially of plurality of structural units of the formula (I):

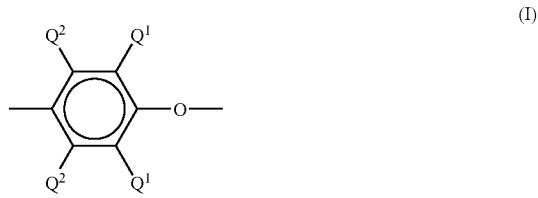

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram as measured in chloroform at 25° C.;
   a polyarylene sulfide; and
   glass fibers; wherein the composition has an unnotched Izod impact strength of greater than or equal to about 5 ft-lb/inch and a UL-94 flammability rating of V-0.

2. The composition of claim 1, having a heat distortion temperature value of greater than or equal to about 250° C., a notched Izod impact strength of greater than or equal to about 1 ft-lb/inch and a UL-94 flammability rating of V-1.

3. The composition of claim 1, having a probability of a first time pass in a UL-94 V-0 test of greater than 0.9 and a heat distortion temperature value of greater than or equal to about 250° C.

4. The composition of claim 1, wherein the polyarylene ether is a polyphenylene ether having an intrinsic viscosity of 0.08 to about 0.15 deciliter per gram as measured in chloroform at 25° C. and wherein the polyarylene sulfide is polyphenylene sulfide.

5. The composition of claim 1, wherein the polyarylene ether is present in an amount of about 1 to about 90 wt %, while the polyarylene sulfide is present in an amount of about 10 to about 99%, based upon the total weight of the composition.

6. The composition of claim 1, further comprising a flow promotor in an amount of about 0.1 to about 1 wt %, based upon the total weight of the high temperature composition.

7. The composition of claim 1, wherein the glass fibers are present in an amount of about 10 to about 70 wt %, based upon the total weight of the high temperature composition.

8. The composition of claim 1, wherein the glass fibers are E-glass, A-glass, C-glass, D-glass, R-glass, S-glass or combinations comprising at least one of the foregoing glasses.

9. The composition of claim 1, further comprising an impact modifier in an amount of about 1 to about 20 wt %, based upon the weight of the high temperature composition.

10. A high temperature composition consisting essentially of:
    a polyphenylene ether consisting essentially of plurality of structural units of the formula (I):

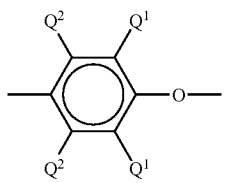

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram as measured in chloroform at 25° C.; and a polyarylene sulfide, wherein the composition has a heat distortion temperature value of greater than or equal to about 250° C., a notched Izod impact strength of greater than or equal to about 1 ft-lb/inch and a UL-94 flammability rating of V-1.

11. The composition of claim 10, having an unnotched Izod impact strength of greater than or equal to about 5 ft-lb/inch and a UL-94 flammability rating of V-0.

12. The composition of claim 10, having a probability of a first time pass in a UL-94 V-0 test of greater than 0.9 and a heat distortion temperature value of greater than or equal to about 250° C.

13. The composition of claim 10, wherein the polyarylene ether is a polyphenylene ether having an intrinsic viscosity of 0.08 to about 0.15 deciliter per gram as measured in chloroform at 25° C. and wherein the polyarylene sulfide is polyphenylene sulfide.

14. The composition of claim 10, wherein the polyarylene ether is present in an amount of about 1 to about 90 wt %, while the polyarylene sulfide is present in an amount of about 10 to about 99%, based upon the total weight of the composition.

15. The composition of claim 10, further comprising a flow promotor in an amount of about 0.1 to about 1 wt %, based upon the total weight of the high temperature composition.

16. The composition of claim 10, further comprising glass fibers in an amount of about 10 to about 70 wt %, based upon the total weight of the high temperature composition.

17. The composition of claim 16, wherein the glass fibers have a diameter of about 13 micrometers and a length of about 3 millimeters.

18. A method of manufacturing an article comprising:
blending a composition consisting essentially of:
a polyarylene ether consisting essentially of plurality of structural units of the formula (I):

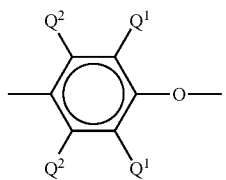

(I)

wherein for each structural unit, each $Q^1$ and $Q^2$ are independently a halogen, a primary or secondary lower alkyl, a phenyl, a haloalkyl, an aminoalkyl, a hydrocarbonoxy, a halohydrocarbonoxy wherein at least two carbon atoms separate the halogen and oxygen atoms, and wherein the polyarylene ether has an intrinsic viscosity of less than or equal to about 0.15 deciliters per gram; a polyarylene sulfide; and glass fibers.

19. The method of claim 18, wherein the blending involves melt blending or solution blending.

20. The method of claim 18, wherein the blending involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

21. The method of claim 18, wherein the blending is conducted in a single or multiple screw extruder, Buss kneader, Henschel, helicones, Ross mixer, Banbury, roll mills, molding machines, injection molding machines, vacuum forming machines, blow molding machine, or combinations comprising at least one of the foregoing machines.

22. The method of claim 18, further comprising molding the composition.

23. The method of claim 22, wherein the molding comprises injection molding.

24. An article comprising the composition of claim 1.

25. An article comprising the composition of claim 10.

26. An article manufactured by the method of claim 18.

* * * * *